United States Patent [19]

Stolzer

[11] 4,080,858

[45] Mar. 28, 1978

[54] CUTTING MACHINE FEED AND CLAMPING ARRANGEMENT

[75] Inventor: Paul Stolzer, Achern, Germany

[73] Assignee: Gesellschaft fur Schneidtechnik mit beschrankter Haftung, Achern, Germany

[21] Appl. No.: 737,573

[22] Filed: Nov. 1, 1976

[30] Foreign Application Priority Data

Oct. 31, 1975 Germany ............................ 2548771

[51] Int. Cl.² ............................................ B26D 7/06
[52] U.S. Cl. ...................................... 83/247; 83/277; 83/282; 83/452
[58] Field of Search ................ 83/206, 247, 277, 282, 83/452

[56] References Cited

U.S. PATENT DOCUMENTS

| | | | |
|---|---|---|---|
| 3,182,538 | 5/1965 | Whitmore et al. | 83/277 X |
| 3,194,100 | 7/1965 | Fehlberg | 83/277 X |
| 3,370,494 | 2/1968 | Schenck | 83/282 X |
| 3,504,585 | 4/1970 | Harris | 83/282 X |
| 3,945,282 | 3/1976 | Aizawa | 83/277 X |

Primary Examiner—Willie G. Abercrombie
Attorney, Agent, or Firm—Craig & Antonelli

[57] ABSTRACT

A feed and clamping arrangement for a cutting machine such as a band saw, circular saw, frame saw or the like. The cutting machine includes a machine table for receiving the material to be cut with a first pair of clamping jaws arranged at a machine stand in front of the cutting plane in the feed direction of the material with a second pair of clamping jaws being arranged in front of the first pair of clamping jaws, as viewed in the feed direction. A rollway is provided for feeding the material to the cutting machine. The rollway includes a frame having several reversibly driven rollers extending transverse to the feed direction. The second pair of clamping jaws is guided for movement in a direction transverse to the feed direction at a forward end of the rollway frame with the frame being guided for movement to and fro in the feed direction together with the second pair of clamping jaws on either an extension of the stand of the cutting machine or on a separate machine stand.

24 Claims, 5 Drawing Figures

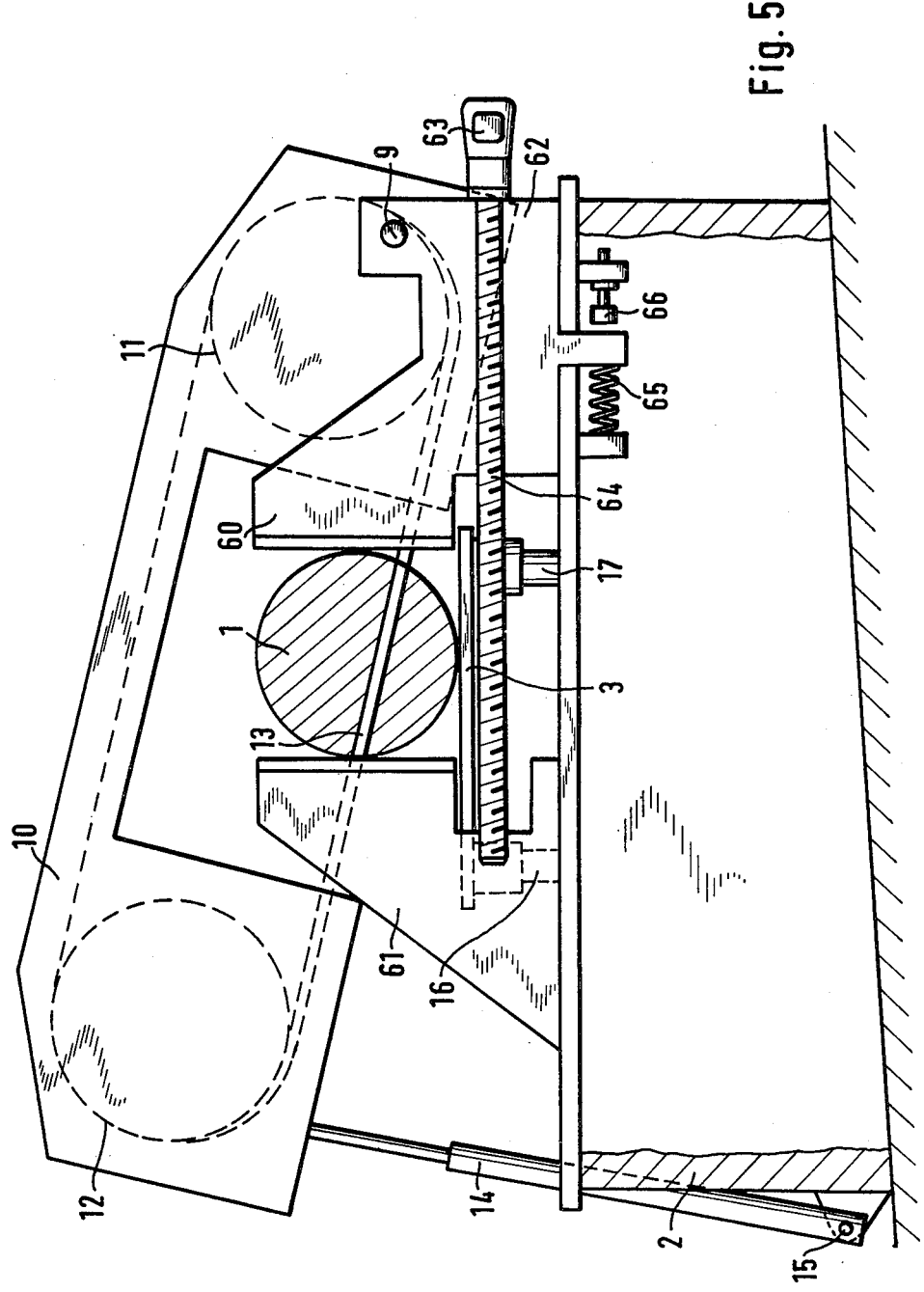

CUTTING MACHINE FEED AND CLAMPING ARRANGEMENT

The present invention relates to a feed and clamping arrangement and, more particularly, to an arrangement for feeding and clamping material on a machine table of a cutting machine such as a band saw, circular saw, frame saw or the like.

Cutting machine feed and clamping devices have been proposed wherein in the feed direction of the material before the cutting plane, a first pair of clamping jaws is guided for opening and closing transversely of the feed direction on the stand of the cutting machine with a second pair of clamping jaws arranged before the first pair of clamping jaws, as viewed in the feed direction, being movable to and fro transversely of the feed direction between stops at least one of which is adjustable. The second pair of clamping jaws is opened in its return movement after a cutting operation with the opening of the second pair of jaws being effected while the first pair of clamping jaws is closed. The second pair of clamping jaws is closed in its feed movement taking place with the first pair of clamping jaws opened and proceeding to close these jaws. In the subsequent cutting operation in which the first pair of clamping jaws is also closed, the material is fed to the clamping jaws and to the cutting machine substantially horizontally by means of a rollway or conveying structure which may be drivable in rotation in both directions. The rollway includes a track having rollers, extending transversely of the feed direction, mounted rotatably in a frame or the like.

In one proposed feeding and clamping apparatus, the second pair of clamping jaws is displaceable on a horizontal plane for opening and closing transversely of the feed direction of the material in a manner similar to the first pair of clamping jaws so that the second pair of clamping jaws can carry out its stroke movement in the feed direction of the material. For the fetching and bringing forward of the material to be severed, the rollway terminates at a point lying ahead of the farthest possible return movement position of the second pair of clamping jaws so that the second pair of clamping jaws has the necessary freedom of movement for its return and forward movements. By virtue of this arrangement, the material to be severed no longer has a support on the last piece of the feed movement so that in the processing of the last piece of a material rod, the material exerts a considerable tilting force upon the clamping between the clamping jaws, thereby leading, in the case of a plurality of last feed steps, to an oblique placing of the material and oblique cut surfaces on the material. This oblique placing of the material becomes more significant when the material being processed has a relatively large cross-section and corresponding large weight.

For the same reasons, the guide rule which is frequently used in such rollways as a lateral material guide cannot be introduced into the stroke region of the second pair of clamping jaws. Consequently, the material to be worked is also without any lateral guidance.

A further disadvantage of the proposed feeding and clamping apparatus resides in the fact that, by virtue of an unpleasant accompanying phenomenon, the material rides up between the clamping jaws with increasing number of feed steps, thereby further leading to oblique cut faces at the ends of the material.

In the proposed clamping jaws, the arrangement is ordinarily made so that one jaw of each pair of jaws is arranged fixed transversely of the feed direction of the material with only the other clamping jaw in each case carrying out the opening and closing movement. By this construction, considerable resistances develop as the material, in its forward movement, grinds on the fixed clamping jaw especially when uneven material such as, for example, forged billets or the like are being processed.

The present invention is concerned with the task to provide a structurally simple feed and clamping arrangement for a cutting machine which operates reliably while eliminating the aforementioned shortcomings.

The underlying problems are solved in accordance with the present invention in that the second pair of clamping jaws is guided for movement transversely of the feed direction at the forward end, as viewd in the feed direction, of the frame of the rollway and the frame together with the second pair of clamping jaws is guided for movement to and fro on an extension of a stand of the cutting machine or on a separate machine stand.

By virtue of this arrangement, the material to be processed is supported by the rollway until it is entirely processed or consumed since the rollway accompanies the movement carried out by the second pair of clamping jaws for the feed of the material in the feed direction, that is, the rollway always reaches as far as the second pair of clamping jaws. Due to the considerable original length of the material rod ordinarily worked on cutting machines, the rollway as a whole likewise has a corresponding length. Consequently, in accordance with the present invention, only one forward section of the rollway is made displaceable in the feed direction in the manner according to the invention while to the rear of the displaceable rollway, a conventional rollway is associated therewith. When the second pair of clamping jaws is advanced in the direction toward the cutting means, such advancement results in the formation of an interval between the displaceable rollway and the conventional rollway, which interval corresponds to the maximum feed distance of the second pair of clamping jaws. However, the presence of such interval is not detrimental since this interval lies at some distance from the pairs of clamping jaws so that no tilting forces can be exerted upon the clamping jaws by a free standing end of the material being processed.

According to another feature of the present invention, the guide for the frame of the rollway is formed by two mutually parallel slide rods extending in the feed direction, each of which are secured at their ends in a common pedestal arranged on the stand with the forward end of the frame being supported through a guide block secured to its and displaceable on the rods between the pedestals and the rear end of the frame being displaceable on rollers which are rotatably mounted beside the rear pedestal over a connecting cross-piece carried by the rods. The forward pedestal opposite to the guide block forms the stop for the feed movement of the frame with the second pair of clamping jaws while the stop for the return movement is formed by a stop connection for the guide block displaceable on the rods between the pedestals. Additionally, a setting spindle rotatably mounted between and in parallel to the rods in the pedestals acts on the guide block and effects the forward and return movement of the frame.

In accordance with further advantages features of the present invention, the second pair of clamping jaws is seated on a vertical clamping rack embracing the maximum material cross-section and is guided vertically displaceably on the frame of the rollway with one of the clamping jaws being formed as transverse connection, extending substantially horizontally beneath the material feed plane, of the vertical members of the rack while the other rear clamping jaw, parallel therewith, is vertically displaceably guided on the rack members. The displaceability of the clamping rack is limited in a downward direction by stops with respect to the frame to a position at which the clamping face of the clamping jaw forming the transverse connection lies a little below the feed plane of the material.

These latter features result in the second clamping jaw pair orienting itself according to the feed plane of the material due to its vertical displaceability given over the clamping rack as a whole without the other functions of the second clamping jaw pair being impaired in any way. Even if the material should have ridden up between the first clamping jaw pair, in every further feed movement by the second clamping jaw pair, even in the closed position thereof, it would sink again to the feed plane as a result of the vertical mobility of the clamping rack at the moment when the first clamping jaw pair is opened for the next feed step.

Additionally, the arrangement of the second clamping jaw pair in accordance with the present invention is also space-saving in comparison with the proposed clamping jaws inasmuch as the stroke of the clamping jaws extending transversely of the feed direction of the material is shifted into the vertical direction in which in any case there is an available space which is not otherwise utilized.

According to another advantageous feature, the upper clamping jaw is displaceable by commonly driven vertical spindles, which may be mounted or arranged with their drive in a yoke connecting the upper ends of the clamping rack members.

In a conventional manner, the rollway can have a substantially vertical abutment wall for the material on one longitudinal side. If in this case the clamping jaw of the first clamping jaw pair which in the closed condition is aligned with its clamping face with the abutment wall in the feed direction and is formed as a stationary clamping jaw, then according to a further advantageous feature of the present invention, the forward end of the guide for the frame of the rollway, when the first clamping jaw pair is opened, is pivotable by a small amount in the direction away from the stationary clamping jaw of the first clamping jaw pair about a vertical pivot axis of the rear end of the frame guide, transversely of the feed direction, substantially horizontally against a stop, by a spring force or the like. Thus, during the feed movement, the material comes free from the fixed clamping jaw of the first clamping jaw pair, so that no friction resistances can occur. If thereafter the first clamping jaw pair is closed again, the frame of the rollway will be pivoted back again against the spring force over the material and the abutment wall.

To provide for the pivotability of the frame of the rollway, in accordance with the present invention, the forward pedestal is guided transversely of the feed direction substantially horizontally displaceably on the stand and the rear pedestal is arranged rotatably on the stand and the forward pedestal is loaded by a spring force or the like transversely of the feed direction toward a stop arranged on the stand on its side opposite to the abutment.

Another possibility for achieving the pivotability of the frame in accordance with the present invention resides in that one of the clamping jaws of the first clamping jaw pair, in the closed condition, is aligned by its clamping face with the abutment wall in the feed direction with this clamping jaw carrying a spindle drive for the clamping spindle acting on the clamping jaw opposite thereto, and with the first-mentioned clamping jaw being displaceable by a small amount away from the opposite clamping jaw against a fixed stop on the stand of the cutting machine, transversely of the feed direction of the material under the action of a spring force or the like. By virtue of this arrangement, upon an opening of the first clamping jaw pair, the clamping jaw which, in the closed condition, is aligned with the abutment wall shifts away somewhat from the workpiece under the action of the spring force and comes out of contact with the workpiece. Only when the first clamping jaw pair is closed again with the aid of the clamping spindle is this latter clamping jaw drawn back onto the workpiece against the spring force. As apparent, the spring force must be so dimensioned that the clamping jaw of the first clamping jaw pair subject to its influence is always moved in the direction toward the workpiece only when the opposite clamping jaw is already in contact with the workpiece.

In all of the above-noted arrangement of the present invention, it is advantageous that the feed plane for the material and the machine table of the cutting machine are placed obliquely in the sense of a descent transversely of the feed movement in the direction toward the abutment face, for which purpose the stand face of the stand of the cutting machine and possibly the frame of the rollway can be made oblique in the sense of a descent of the feed plane for the material transversely of the feed movement in the direction toward the abutment face.

Additionally, to reduce friction resistance in the material feed, it is advantageous in accordance with the present invention, that the machine table is selectively lowerable slightly below the material feed plane during the feed movement of the material.

Accordingly, it is an object of the present invention to provide a feed and clamping arrangement for a cutting machine which avoids by a simple means the aforementioned shortcomings and drawbacks encountered in the prior art.

A further object of the present invention resides in providing a feed and clamping arrangement for a cutting machine which supports the remainder of material to be worked by a rollway.

Yet another object of the present invention resides in providing a feed and clamping arrangement for cutting machines which counteracts, if not prevents, the residing up of the material in the clamping jaws during processing.

A still further object of the present invention resides in providing a feed and clamping arrangement for cutting machines which precludes the grinding of material on the clamping jaws during a feed or return movement of the second pair of clamping jaws.

Another object of the present invention resides in providing a feed and clamping arrangement for cutting machines which is relatively simple in construction and, therefore, relatively inexpensive which reduces the space required in comparison to prior art proposals.

These and other features, objects and advantages of the present invention will become more apparent from the following description when taken in connection with the accompanying drawings, which show, for the purpose of illustration only, several embodiments of a feed and clamping arrangement for cutting machines in accordance with the present invention, and wherein:

FIG. 5 is a cross-sectional view of a further embodiment of a band saw machine in accordance with the present invention.

Figure 1:
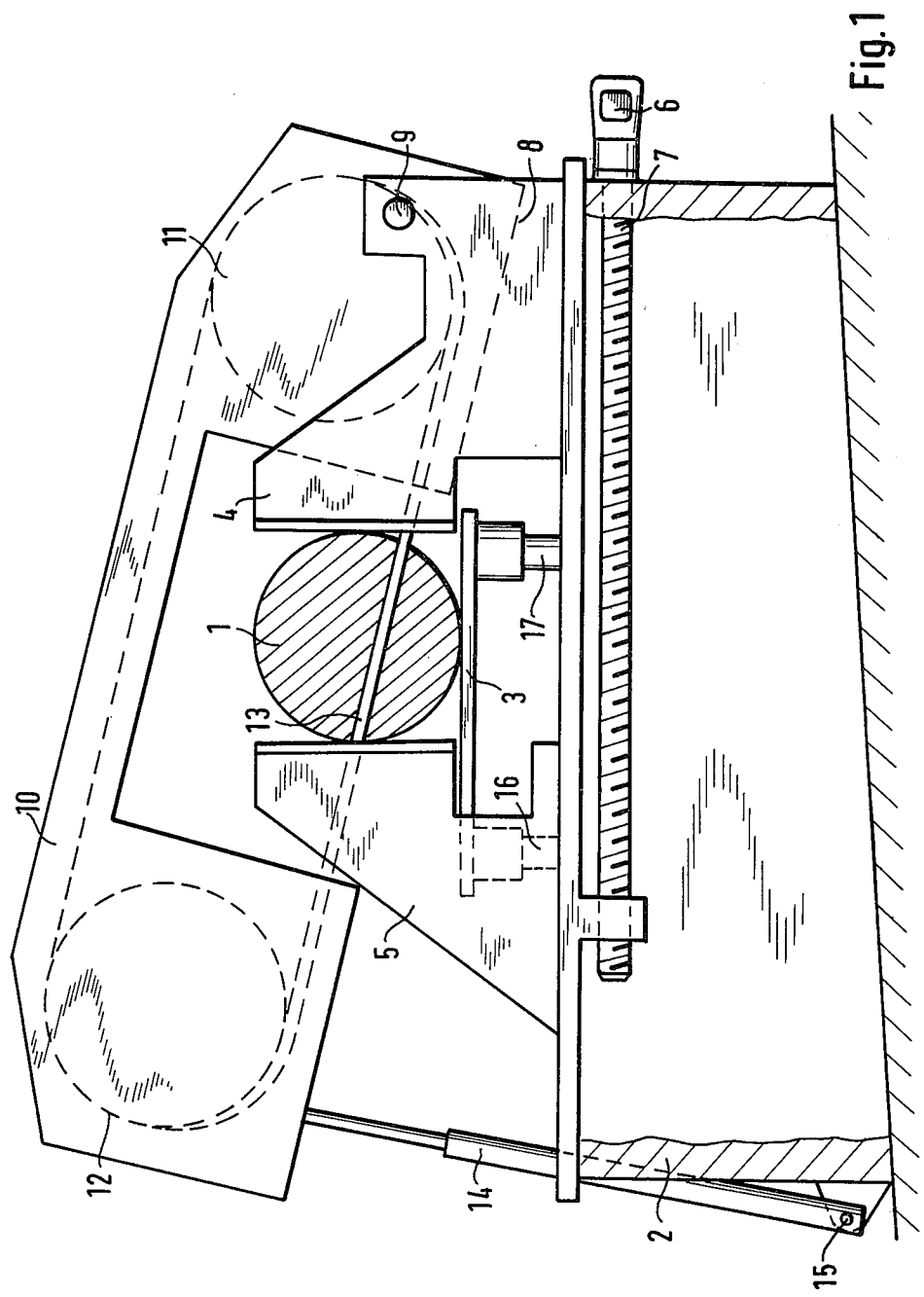
FIG. 1 is a partial cross-sectional view of a band saw cutting machine in accordance with the present invention taken along the line I—I in FIG. 2.

Referring now to the drawings wherein like reference numerals are used throughout the various views to designate like parts and, more particularly, to FIG. 1, according to this figure, a cutting machine fashioned as a band saw is provided and includes a machine stand 2 on which is arranged a machine table 3 for holding the material 1. A first pair of clamping jaws 4, 5 is provided for clamping the material 1 on the machine table 3 with the clamping jaw 4 being arranged fixedly on the machine stand 2 with the clamping jaw 5 being displaceable transversely of the feed direction of the material by way of a spindle 7 which may be driven, for example, by a motor 6.

The clamping jaw 4 includes a pedestal 8 which pivotally mounts a machine head or rack 10 by a pivot means 9. Two reversing wheels 11, 12 are rotatably mounted in the machine head 10 between which an endless saw band 13 circulates. As viewed in FIG. 1, the cutting plane of the saw band 13 lies directly behind the clamping jaws 4 and 5.

A conventional cylinder piston assembly 14 is provided for selectively pivoting the saw band 13 toward and away from the material 1 with the assembly 14 being pivoted at 15 to the machine stand 2 and acting with its piston rod on the machine head 10 in a conventional manner not illustrated in detail.

Cylinder piston assemblies 16, 17 support the machine table 3 with respect to the machine stand 2 whereby it is possible to selectively lower the machine table 3 somewhat during the feed of the material 1, thereby precluding the grinding of the material on the machine table 3.

Figure 2:
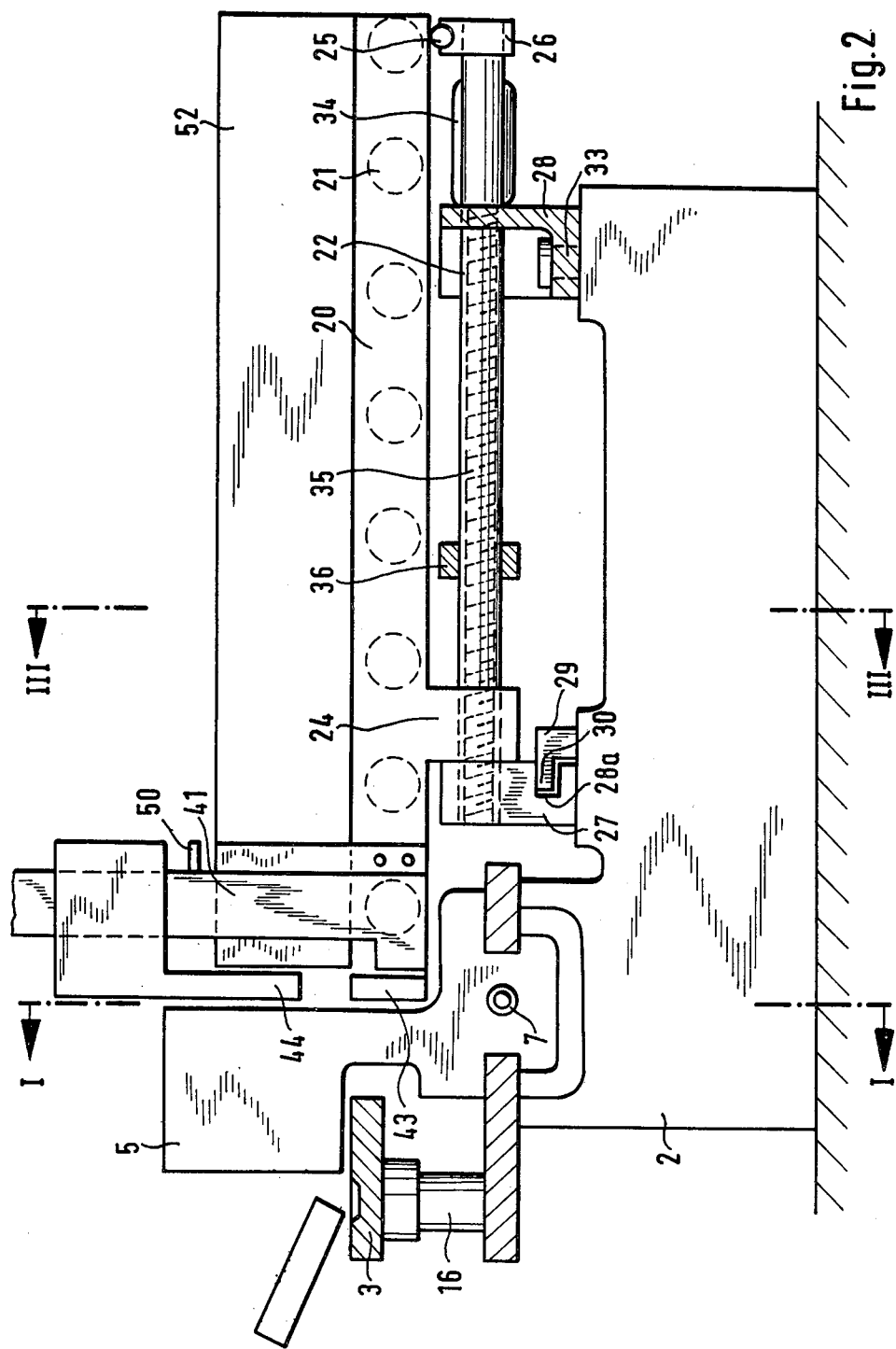
FIG. 2 is a lateral elevation of a displaceable rollway and second clamping jaw pair in accordance with the present invention.
Figure 3:
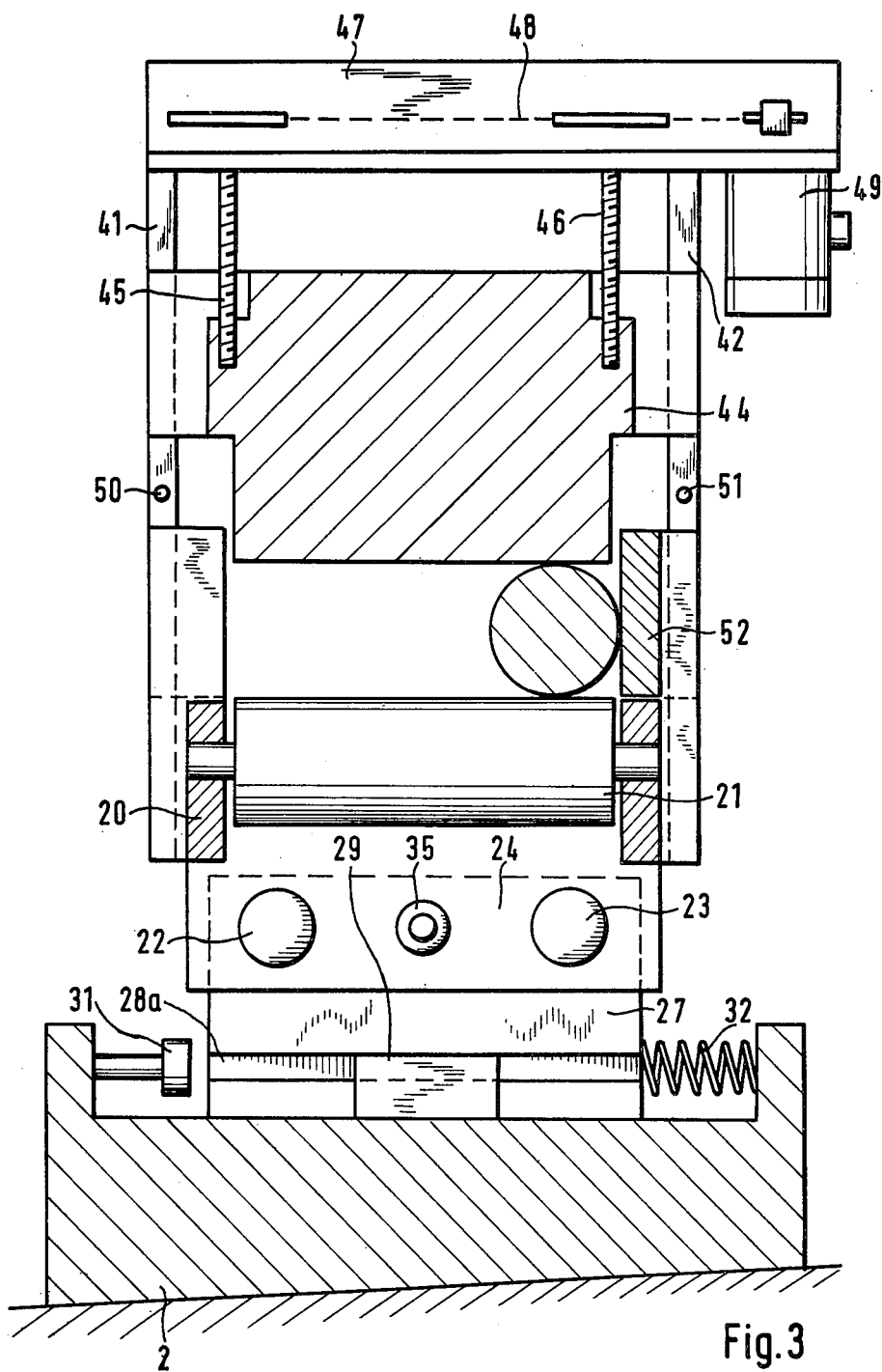
FIG. 3 is a cross-sectional view taken along the line III—III in FIG. 2.
Figure 4:
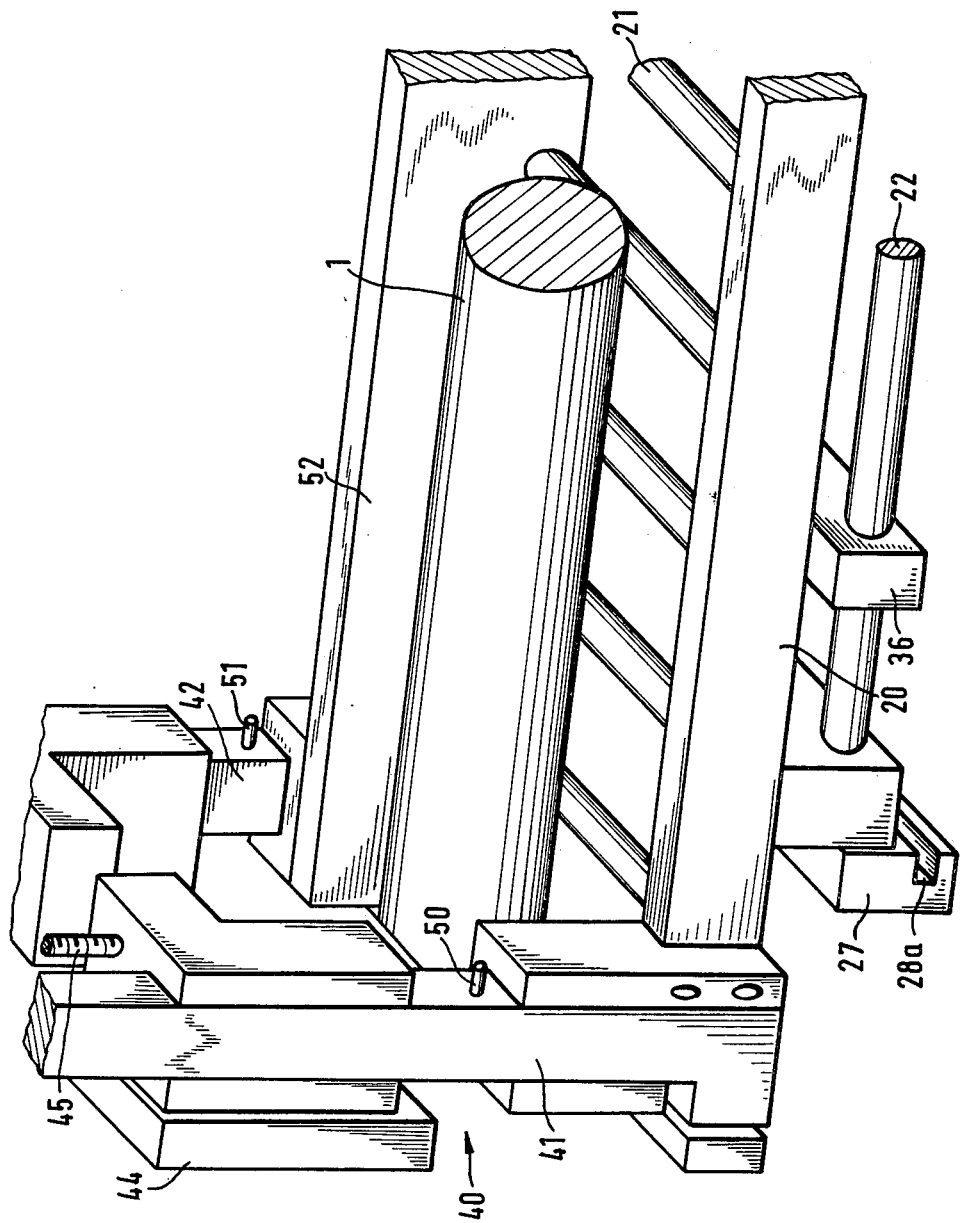
FIG. 4 is a perspective partial plan view of the arrangement of FIG. 2.

Forwardly of the cutting machine, as viewed in FIG. 1, an apparatus as shown in FIGS. 2-4 is arranged on an extension of the machine stand 2 constructed thereof or, in lieu of an extension of the machine stand, a further machine stand could be provided which is connected with the machine stand 2 of the band saw cutting machine when the installation is set up.

As shown in FIGS. 2-4, a frame 20 is provided at which rollers 21 are rotatably mounted so as to form a rollway for the feed of the material 1 to the band saw cutting machine. The rollers 21 may be driven by conventional means (not shown) in both directions to support the feed operation for the material 1, as will be explained more fully hereinafter.

As shown most clearly in FIG. 3, the frame 20 is displaceable on slide rods 22, 23 in the feed direction with the frame 20 seated at the front end, as viewed in the feed direction, with a guide block 24 (FIG. 2) receiving the rods 22, 23. The rear end of the frame 20 is supported through rollers 25 (FIG. 2) which are rotatably mounted in a connecting cross-piece 26 carried by the slide rods 22 and 23.

As shown most clearly in FIG. 2, slide rods 22, 23 are carried by pedestals 27 and 28 with the pedestal 27 being displaceable on the machine stand 2 transversely of the feed direction of the material 1 while a support part 29 secured on the machine stand 2 engages with a web 30 in a groove 28a provided in the pedestal 27. By virtue of the web groove arrangement, a shape-locking connection is provided so as to make the pedestal 27 fast in the vertical direction.

As shown in FIG. 3, the transverse mobility of the pedestal 27 is limited on one side by a stop 31 carried by the machine stand 2 with a spring 32, supported against the machine stand 2, acting upon the other side of the pedestal 27. The stop 31 is not shown in FIG. 2 so as to illustrate the displaceability of the pedestal 27.

The pedestal 28 is rotatably mounted by a journal 33 on the machine stand 2 so that the guide for the frame 20 of the rollway as a whole can carry out a limited pivotal movement about journal 33.

A setting spindle 35, driven by a motor 34, is provided for moving the frame 20 to and fro in the feed direction of the material. The setting spindle 35 is rotatably mounted in the pedestals 27 and 28 and is in threaded engagement with the guide block 24. The displacement distance is here limited by stops, one of which is formed by the pedestal 27 while the other is formed as an adjustable stop 36 which is securable on the slide rods 22, 23.

As shown in FIG. 4, at the forward end of the frame 20, as viewed in the direction of feed of the material 1, a clamping rack generally designated by the reference numeral 40 is guided for vertical displacement along with its vertical members 41 and 42. The clamping rack 40 carries a second pair of clamping jaws 43 and 44 with clamping jaw 43 being formed as a transverse connection of the members 41 and 42 extending beneath the feed plane of the material 1, while the clamping jaw 44 is guided for vertical displacement on the members 41, 42. The vertical opening and closing movement of the clamping jaw 44 is effected by spindles 45 and 46 mounted in a yoke 47 connecting the upper ends of the members 41, 42 with drive 48 and drive motor 49, common to the spindles 45, 46 also being carried by the yoke 47.

Stops 50, 51 are provided for limiting the vertical displaceability of the clamping rack 40 in the downward direction. The stops 50, 51 are arranged at the clamping rack such that when the clamping rack 40 is seated at the stops 50, 51, the clamping face of the clamping jaw 43 lies a short distance below the feed plane of the material.

On the side of the feed path for the material at which the stationary clamping jaw 4 is arranged, the frame 20 is provided with an abutment wall 52 for the material by which the material is prevented from tilting laterally. In order to aid preventing lateral tilting, as may be seen from FIGS. 1 and 3, the machine stand 2 may be inclined as a whole in the direction toward the abutment wall 52.

The manner of operation of the feed and clamping arrangement of FIGS. 1-4 is as follows:

As a piece of material 1 is severed by the saw band 13, the machine head 10 is raised at high speed to a height at least sufficient for the saw band 13 to be clear of the cross-sectional region of the material 1. By way of the spindles 45 and 46, the clamping jaw 44 of the second pair of clamping jaws is raised with the clamping rack 40 slipping downwardly at the same time by reason of its weight, until the clamping rack 40 comes into abutment against the stops 50, 51. Consequently, both the clamping jaws 43 and 44 of the second clamping jaw pair come free from the material 1 lying on the rollers 21.

By way of the motor 34, the frame 20 and thus the rollway including the second pair of clamping jaws 43, 44 are moved in the feed direction away from the first pair of clamping jaws 4, 5 until the guide block 24 strikes against the adjustable stop 36. By virtue of the adjustability of the stop 36 in the feed direction, the length of the material piece to be fed in each case is determinable. This reverse movement of the rollway can be supported by corresponding drive of the rollers 21 in the direction of a reduction of the movement resistance.

By a renewed opposite drive of the spindles 45, 46, the second pair of clamping jaws 43, 44 is re-closed with the clamping jaw 44 first running up onto the material and then by further drive of the spindles 45, 46, the clamping rack 40 is raised until the lower clamping jaw 43 likewise comes to abut against the material 1.

Thereupon, the movable clamping jaw 5 of the first clamping jaw pair is driven away from the workpiece by appropriate drive of the spindle 7 through the motor 6 so that the first pair of clamping jaws 4, 5 is opened. By virtue of this action, the pedestal 27 is pivoted by the action of the spring 32 against the stop 31 whereby, at the same time, the material 1 comes free from the stationary clamping jaw 4 of the first clamping jaw pair.

Simultaneously with the opening of the first pair of clamping jaws 4, 5, the machine table 3 is lowered by a few millimeters by actuation of the cylinder piston assemblies 16, 17 so that the surface of the machine table 3 is situated a short distance below the material feed plane.

Thereupon, with the aid of the motor 34, the frame 20 with the second pair of clamping jaws 43, 44 seated thereon and the material 1 clamped in the clamping jaws 43, 44, is advanced until the guide block 24 strikes against the pedestal 27, thereby advancing the material 1 by the desired amount.

Now the first pair of clamping jaws 4, 5 is closed again by way of spindle 7 and motor 6 with the displaceable clamping jaw 5 first coming into abutment against the material 1 and then pivoting the frame 20, through the material 1, against the action of the spring 32 until the material 1 comes to abut against the stationary clamping jaw 4 so as to clamp the material 1 in the first pair of clamping jaws 4, 5.

Thereupon the machine table 3 is lifted against the material by actuation of the cylinder piston assemblies 16 and 17.

Finally, by actuation of the cylinder piston assembly 14, the pivotable machine head 10 of the band saw cutting machine is lowered so that, by the action of the circulating saw band 13, the advanced material 1 is severed. Thereupon, the above-described course of operation is repeated.

While the drawings do not illustrate the provision of a conventional stationary rollway adjoining the displaceable rollway so as to accommodate greater lengths of material, it is understood that it is only essential that an interval be maintained between the axially displaceable and stationary rollways, so as to provide sufficient freedom of movement for the rollway which is displaceable in the feed direction of the material.

In order to avoid contact of the material with the clamping jaws of the first pair of clamping jaws 4, 5 during a material feed, in place of the transverse displaceability of the pedestal 27 of the rollway, an arrangement such as shown, in simplified form, in FIG. 5 may be employed wherein the first pair of clamping jaws includes jaws 60, 61 with the jaw 60 including a block or pedestal 62 at which the rack or machine head 10 of the band saw is pivotally mounted by pivot means 9.

The two clamping jaws 60, 61 are guided on the machine stand 2 for displacement transversely of the feed direction of the material 1 with the opening and closing movements for the first pair of clamping jaws 60, 61 being effected by a spindle 64 driven by a motor 63. The spindle 64 is rotatably mounted in the block 62 and is in threaded connection with the clamping jaw 61.

The mobility of the block 62 carrying the clamping jaw 60 under the action of a spring 65 away from the material 1 is limited by a stop 66 arranged at the machine stand 2 to a small amount of a few millimeters. The arrangement as a whole is made such that the clamping face of the clamping jaw 60 is aligned with the abutment wall 52 of the rollway when the first pair of clamping jaws 60, 61 is closed.

If the first pair of clamping jaws 60, 61 is opened by operation of the motor 63, the clamping jaw 61 moves to the left in FIG. 5 and, at the same time, the clamping jaw 60 can be moved by the action of the spring 65 to the right against the stop 66 with the machine head 10 of the band saw accompanying this movement. Thus, the two clamping jaws 60, 61 come free from the material 1.

If the first pair of clamping jaws 60, 61 is re-closed, first the clamping jaw 61 comes into abutment on the material 1 whereupon, with a further movement of the spindle 64, the clamping jaw 60 is drawn to the material 1 against the action of the spring 65.

While I have shown and described several embodiments in accordance with the present invention, it is understood that the same is not limited thereto, but is susceptible of numerous changes and modifications as known to a person skilled in the art, and I therefor do not wish to be limited to the details shown and described herein, but intend to cover all such changes and modifications as are encompassed by the scope of the appended claims.

I claim:

1. A feed and clamping arrangement for a cutting machine having a machine table for receiving material to be cut, a first pair of clamping jaws arranged at the machine table in front of a cutting plane of the cutting machine, as viewed in a feed direction of the material, the clamping jaws being guided for opening and closing in a direction transverse to the feed direction, a second pair of clamping jaws arranged upstream of the first pair of clamping jaws, as viewed in the feed direction, rollway means for substantially horizontally feeding the material to the cutting machine including a plurality of reversibly driven rollers rotatably mounted in a frame, wherein the improvement comprises:

means for mounting the second pair of clamping jaws at a forward end of the frame, as viewed in the feed direction, for movement in a direction transverse to the feed direction including a vertically extending clamping rack arranged vertically displaceable at the frame having a pair of vertical members spaced from each other so as to accommodate a maximum cross-section of the material to be cut, one clamping jaw of the second pair of clamping jaws is fashioned as a transverse connection between said vertical members extending substantially horizontally beneath a feed plane of the material, the other clamping jaw of said second pair of clamping jaws being mounted in parallel to the first clamping jaw of said second pair of clamping jaws so as to be vertically displaceably guided on said vertical member, stop means for limiting downward displacement of the clamping rack relative to the frame such that the clamping jaw fashioned as the transverse connection is at a position slightly below the feed plane of the material, means provided on at least one of an extension of the machine table and a separate machine stand for selectively guiding the frame together with the second pair of clamping jaws for movement to and fro in the feed direction, including two mutually parallel slide rods extending in a feed direction, pedestal means arranged at the machine table for mounting said slide rods at the machine table, guide block means arranged on the frame at the forward end thereof displaceable along said slide rods between said pedestal means with one of said pedestal means limiting the forward movement of the frame and and the second pair of clamping jaws, a connecting cross-piece mounted on said slide rods at a rear end of the frame, and roller means interposed between said connecting cross-piece and said frame for displaceably supporting said frame, a stop means for limiting a return movement of the frame, setting spindle means rotatably mounted in the pedestal means in parallel to said slide rods and operatively connected with said guide block means to selectively displace the frame and the second pair of clamping jaws, and means for opening the second pair of clamping jaws after a cutting operation while the first pair of clamping jaws are closed and for closing said second pair of clamping jaws during a movement in the feed direction with the first pair of clamping jaws being initially opened and proceeding to close prior to a subsequent cutting operation.

2. An arrangement according to claim 1, wherein commonly driven vertical spindle means are provided for vertically displacing the other clamping jaw of said second pair of clamping jaws.

3. An arrangement according to claim 2, wherein a yoke means is provided for connecting upper ends of said vertical members, and wherein a drive for the commonly driven spindle means is arranged at said yoke means.

4. An arrangement according to claim 3, wherein a substantially vertically extending abutment wall means is provided along one longitudinal side of said rollway means for preventing lateral tilting of the material.

5. An arrangement according to claim 4, wherein one clamping jaw of said first pair of clamping jaws includes a clamping face aligned with the abutment wall means in a closed position of said first pair of clamping jaws, said last-mentioned clamping jaw being stationarily mounted at the machine stand, and wherein a forward end of the frame guide means is pivotable about a vertical pivot axis arranged at the end of the frame guide means transversely of the feed direction and substantially horizontally by a short distance in a direction away from the stationarily mounted clamping jaw of said first pair of clamping jaws, stop means are provided for limiting the pivotal displacement of said frame guide means, and means are provided for normally biasing said frame guide means in a direction opposite the pivotal displacement direction.

6. An arrangement according to claim 5, wherein two spaced pedestal means are provided and wherein means are provided for substantially horizontally guiding one of said pedestal means on the machine stand for displacement in a direction transverse to the feed direction, and means are provided for rotatably supporting the other of said pedestal means on the machine stand.

7. An arrangement according to claim 5, wherein said means for biasing includes a spring means acting upon said first-mentioned pedestal means in a direction transverse to the feed direction, and wherein said stop means for limiting the pivotal displacement of the frame guide means is arranged on the machine stand on a side thereof opposite said abutment wall means.

8. An arrangement according to claim 4, wherein one clamping jaw of said first pair of clamping jaws includes a clamping surface which, when the first pair of clamping jaws is in a closed position, is in alignment in the feed direction with said abutment wall means, and wherein a spindle drive means is provided for operatively connecting the two clamping jaws of said first pair of clamping jaws, said one clamping jaw of said first pair of clamping jaws being displaceable by a short distance away from the other clamping jaw in a direction transverse to the feed direction, stop means provided on the machine stand for limiting the displacement of said one clamping jaw, and means for normally biasing said one clamping jaw in a direction opposite the displacement direction thereof.

9. An arrangement according to claim 8, wherein the feed plane for the material and the machine table of the cutting machine are arranged obliquely when viewed in a descent transversely of the feed direction toward said abutment wall means.

10. An arrangement according to claim 9, wherein the machine stand includes a standing surface, and wherein one of the standing surface and the frame is arranged obliquely as viewed in a descent transversely of the feed direction in a direction toward the abutment wall means.

11. An arrangement according to claim 10, wherein means are provided for selectively lowering the machine table at least slightly below the feed plane of the material during a feed movement of the material.

12. A feed and clamping arrangement for a cutting machine having a machine table for receiving material to be cut, a first pair of clamping jaws arranged at the machine table in front of a cutting plane of the cutting machine, as viewed in a feed direction of the material, said first pair of clamping jaws being guided for opening and closing in a direction transverse to the feed direction, a second pair of clamping jaws arranged upstream of the first pair of clamping jaws, as viewed in the feed direction, rollway means for substantially horizontally feeding the material to the cutting machine including a plurality of reversibly driven rollers rotatably mounted in a frame, wherein the improvement comprises:

means for mounting the second pair of clamping jaws at a forward end of the frame, as viewed in the feed direction, for movement in a direction transverse to the feed direction including a vertically extending clamping rack arranged vertically displaceable at the frame having a pair of vertical members spaced from each other so as to accommodate a maximum cross-section of the material to be cut, one clamping jaw of the second pair of clamping jaws is fashioned as a transverse connection between said vertical members extending substantially horizontally beneath a feed plane of the material, the other clamping jaw of said pair of clamping jaws being mounted in parallel to the first clamping jaw of said second pair of clamping jaws so as to be vertically displaceably guided on said vertical member, stop means for limiting downward displacement of the clamping rack relative to the frame such that the clamping jaw fashioned as the transverse connection is at a position slightly below the feed plane of the material, and means provided on at least one of an extension of the machine table and a separate machine stand for selectively guiding the frame together with the second pair of clamping jaws for movement to and fro in the feed direction.

13. An arrangement according to claim 12, wherein commonly driven vertical spindle means are provided for vertically displacing the other clamping jaw of said second pair of clamping jaws.

14. An arrangement according to claim 13, wherein a yoke means is provided for connecting upper ends of said vertical members, and wherein a drive for the commonly driven spindle means is arranged at said yoke means.

15. An arrangement according to claim 14, wherein a substantially vertically extending abutment wall means is provided along one longitudinal side of said rollway means for preventing lateral tilting of the material.

16. An arrangement according to claim 15, wherein means are provided for selectively lowering the machine table at least slightly below the feed plane of the material during a feed movement of the material.

17. An arrangement according to claim 12, wherein a substantially vertically extending abutment wall means is provided along one longitudinal side of said rollway means for preventing lateral tilting of the material.

18. An arrangement according to claim 12, wherein means are provided for opening the second pair of clamping jaws after a cutting operation while the first pair of clamping jaws are closed and for closing said second pair of clamping jaws during a movement in the feed direction with the first pair of jaws being initially open and proceeding to close prior to a subsequent cutting operation.

19. An arrangement according to claim 12, wherein at least one adjustable stop means is provided for limiting movement of the second pair of clamping jaws in the feed direction.

20. An arrangement according to claim 12, wherein means are provided for selectively lowering the machine table at least slightly below the feed plane of the material during a feed movement of the material.

21. A feed and clamping arrangement for a cutting machine having a machine table for receiving material to be cut, a first pair of clamping jaws arranged at the machine table in front of a cutting plane of the cutting machine, as viewed in a feed direction of the material, guided for opening and closing in a direction transverse to the feed direction, a second pair of clamping jaws arranged upstream of the first pair of clamping jaws, as viewed in the feed direction, rollway means for substantially horizontally feeding the material to the cutting machine including a plurality of reversibly driven rollers rotatably mounted in a frame, wherein the improvement comprises:

means for mounting the second pair of clamping jaws at a forward end of the frame, as viewed in the feed direction, for movement in a direction transverse to the feed direction, means provided on at least one of an extension of the machine table and a separate machine stand for selectively guiding the frame together with the second pair of clamping jaws for movement to and fro in the feed direction, a substantially vertically extending abutment wall means provided along one longitudinal side of said rollway means for preventing lateral tilting of the material, one clamping jaw of said first pair of clamping jaws includes a clamping face aligned with the abutment wall means in a closed position of said first pair of clamping jaws, said last-mentioned clamping jaws being stationarily mounted at the machine table, a forward end of the frame guide means is pivotable about a vertical pivot axis arranged at the end of the frame guide means transversely of the feed direction and substantially horizontally by a short distance in a direction away from the stationarily mounted clamping jaw of said first pair of clamping jaws, stop means for limiting the pivotal displacement of said frame guide means, and means for normally biasing said frame guide means in a direction opposite the pivotal displacement direction.

22. An arrangement according to claim 21, wherein two spaced pedestal means are provided and wherein means are provided for substantially horizontally guiding one of said pedestal means on the machine stand for displacement in a direction transverse to the feed direction, and means are provided for rotatably supporting the other of said pedestal means on the machine stand.

23. An arrangement according to claim 22, wherein said means for biasing includes a spring means acting upon said first-mentioned pedestal means in a direction transverse to the feed direction, and wherein said stop means for limiting the pivotal displacement of the frame guide means is arranged on the machine stand on a side thereof opposite said abutment wall means.

24. An arrangement according to claim 17, whereon one clamping jaw of said first pair of clamping jaws includes a clamping surface which, when the first pair of clamping jaws is in a closed position, is in alignment in the feed direction with said abutment wall means, and wherein a spindle drive means is provided for operatively connecting the two clamping jaws of said first pair of clamping jaws, said one clamping jaw of said first pair of clamping jaws being displaceable by a short distance away from the other clamping jaw in a direction transverse to the feed direction, stop means provided on the machine stand for limiting the displacement of said one clamping jaw, and means for normally biasing said one clamping jaw in a direction opposite the displacement direction thereof.

* * * * *